United States Patent [19]

League

[11] Patent Number: 4,805,665

[45] Date of Patent: Feb. 21, 1989

[54] FLUID FLOW CHECK DEVICE

[76] Inventor: Billy E. League, 109 Archer, White Oak, Tex. 75693

[21] Appl. No.: 140,461

[22] Filed: Jan. 4, 1988

[51] Int. Cl.[4] .............................................. F16K 37/00
[52] U.S. Cl. .................................... 137/554; 116/277; 200/81.9 R
[58] Field of Search ................ 137/554; 116/275, 277; 200/81 R, 81.9 R, 81.9 M

[56] References Cited

U.S. PATENT DOCUMENTS

| | | | |
|---|---|---|---|
| 2,029,633 | 2/1936 | Muhleisen | 116/275 X |
| 2,514,731 | 7/1950 | Sourber | 200/81.9 R |
| 2,940,070 | 6/1960 | Sanders | 137/554 X |
| 3,085,432 | 4/1963 | Bloom et al. | 116/27 S |
| 3,240,062 | 3/1966 | Fredriksson | 200/81.9 R X |
| 3,360,621 | 12/1967 | Liddell | 200/81.9 M X |
| 3,857,277 | 12/1974 | Moore | 137/554 X |
| 4,353,390 | 10/1982 | Karpenko | 137/554 X |
| 4,625,758 | 12/1986 | Murray | 137/554 |

FOREIGN PATENT DOCUMENTS 1153114  8/1983  Canada ................ 137/554

Primary Examiner—John Rivell

[57] ABSTRACT

A fluid flow check device is adapted for interconnection with a fluid flow line check valve, and includes a housing having a switch mounted therein. A pivot shaft is connectable at a first end to a flapper pivot axle of the check valve and at a second to the switch. A timed alarm circuit is connected to the switch and activates an alarm when fluid flow starts to cease for a preset duration.

4 Claims, 1 Drawing Sheet

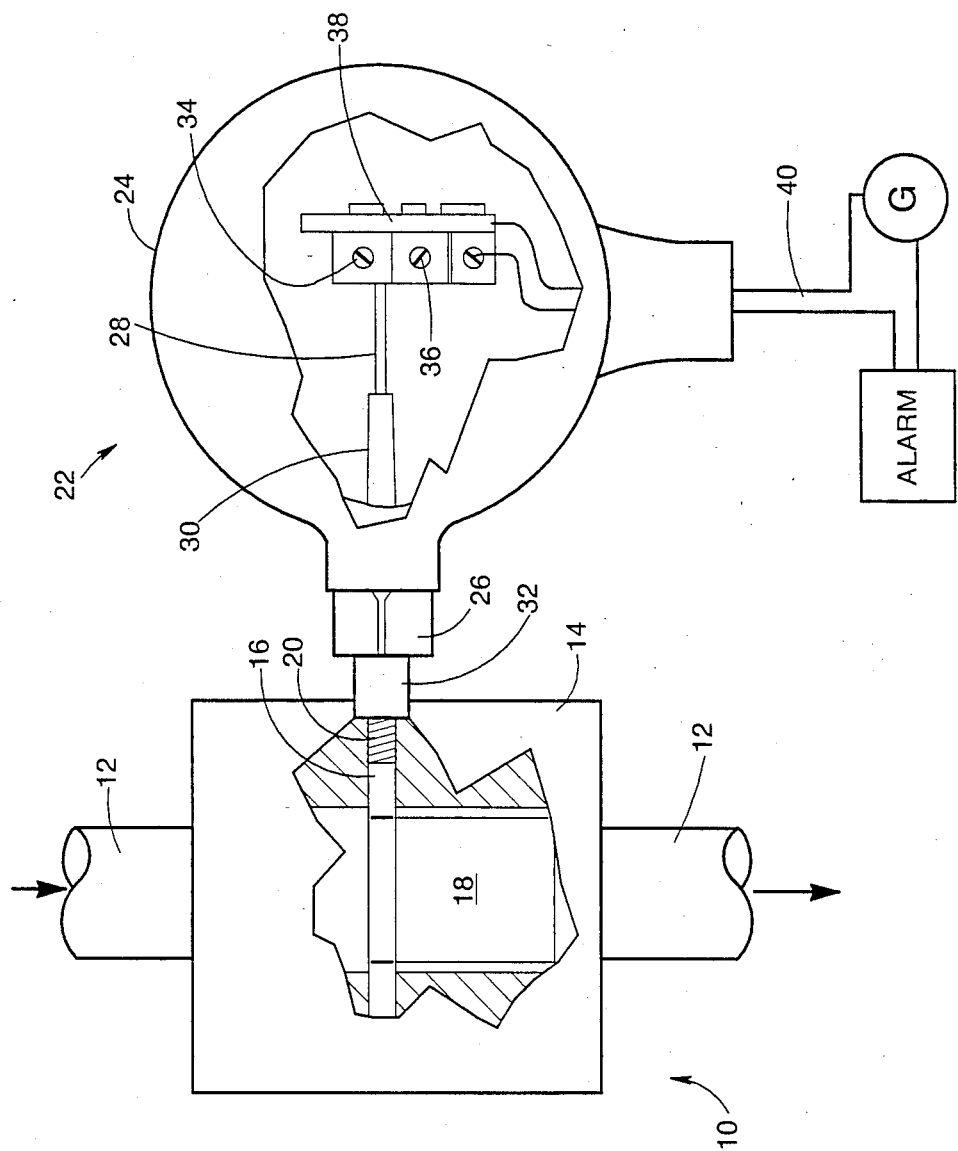

FLUID FLOW CHECK DEVICE

BACKGROUND OF THE INVENTION

1. Field of the Invention

The present invention comprises a fluid flow check device and, more particularly, to such a fluid flow check device that is connectable to an existing fluid flow line check valve.

2. Setting of the Invention

In the art of the fluid flow line control, flapper-type check valves are utilized to permit fluid flow in one direction but prevent it in an opposite direction. In fluid distribution facilities, such as a refinery or an oil field collection and treatment facility, hundreds of these check valves are required. In some applications, it is desired to have an alarm sound if fluid flow starts or stops through a pipe or conduit. A simple solution is to replace the existing check valve with an alarm equipped check valve. The problem with this solution is that the alarm equipped check valves are a single unit that are much more expensive than the conventional check valves. Further, it is time consuming and expensive to have to replace the check valves. Another consideration is that fluid distribution facilities are constantly being altered. Therefore, there is a need for a simple alarm device that can be easily connected and disconnected from existing check valves.

SUMMARY OF THE INVENTION

The present invention has been designed to overcome the foregoing deficiencies and meet the above-described needs. Specifically, the present invention comprises a fluid flow check device that is easily connectable to a fluid flow line check valve. The fluid flow check device includes a housing with an opening therethrough and a switch mounted therein. A pivot shaft extends through the opening in the housing, and a first end thereof is connected to a flapper pivot axle within the check valve and a second end thereof actuates the switch. An alarm mechanism is operatively connected to the switch for indicating a fluid flow or no-fluid flow condition of the check valve.

BRIEF DESCRIPTION OF THE DRAWING

The drawing is a partial cutaway elevational view of a fluid flow check device, embodying the present invention, connected to a fluid flowline check valve.

DETAILED DESCRIPTION OF THE PREFERRED EMBODIMENTS

The present invention comprises a fluid flow check device that is easily connectable to a fluid flow line check valve. As shown in the drawing, an existing check valve 10 is interconnected to a fluid flow line 12, as is well known in the art. The check valve 10 can be of any known configuration; however, for the purposes of the present discussion of one embodiment of the present invention, it is assumed that the check valve 10 is a flapper-type. A check valve housing 14 includes in its interior a transverse flapper pivot axle 16 that is journaled within the housing 14. A fluid flow stopping, flapper plate 18 is connected to the axle 16 so that fluid flowing through the flowline 12 in one direction (as shown in the Drawing) pushes the flapper plate 18 into an open position. However, fluid flow in an opposite direction pushes the flapper plate 18 against an opening (not shown) in the fluid flow line 12 to prevent fluid flow. The flapper plate 18 can be spring biased into a closed position.

In the event that the check valve 10 is to be equipped with an alarm, then a bore 20 is drilled, if not already present, into the housing 14 coaxial with the axle 16. Into the bore 20 is threadably connected and supported a fluid flow line check device 22.

The fluid flow line check device 22 comprises a housing 24 having a lateral extension 26 and opening therein through which extends a pivot shaft 28. Appropriate bushings 30 and seals 32 are provided to ensure that no fluid from the check valve 10 exits through the opening 20 and into the housing 24.

A first end of the pivot shaft 28 is provided with devices for coaxial connection to the axle 16. The devices can comprise slip on/over rubber or metal sleeves, threaded connectors, and the like. Also, the ends of the axle 16 and the shaft 28 can be welded together.

A second end of the pivot shaft 28 is provided with an extension, bulge or flattened portion which activates a switch 34, mounted by screws 36, to the interior of the housing 24. The switch 34 can be a mechanical, balance or mercury switch. Preferably, the switch 34 is a microelemental momentary contact switch.

Mounted within the housing 14 and electrically connected to the switch 34 is a timer circuit 38; however, the timer circuit 38 is optional.

The switch 34 is connected by electrical wiring 40 to a power source and an audible, visual alarm or other indication device. By the type of connection of the wiring 40 to the switch 34, the alarm will be activated upon the opening or the closing of the flapper 18 within the check valve 10 by rotation of the axle 16 and the shaft 28. Further, the timer circuit 38 can be used to delay or cancel the alarm indication if a flow or no-flow condition has not persisted for a predetermined minimum time period. For example, due to fluid flow fluctuations, it is not desired to activate the alarm every time the flapper 18 closes, but only if the not desired flow condition remains continuously for a period of about 10–20 seconds.

By utilizing the present invention, a simple, inexpensive fluid flow line check device can be easily connected to an existing check valve without the need for removing or replacing the check valve.

Wherein the present invention has been described in particular relation to the Drawing attached hereto, it should be understood that other and further modifications, a part from those shown or suggested herein, may be made within the scope and spirit of the present invention.

What is claimed is:

1. A fluid flow check device adapted for interconnection with a fluid flow line check valve while the check valve is positioned in the flow line, comprising:
   a pivot shaft removably connected at a first end with a flapper pivot axle within the check valve while the check valve is positioned in the flow line;
   a fluid flow check device housing having an opening therethrough;
   a switch mounted within the fluid flow check device housing actuated by rotation of a second end of the pivot shaft, which extend into the fluid flow check device housing through the opening; and
   alarm means operatively connected to the switch for indicating a fluid flow or no-fluid flow condition of the check valve.

2. A fluid flow check device of claim 1 wherein the housing is connected to the check valve.

3. A fluid flow check device of claim 1 wherein the switch comprises an electrical momentary contact micro switch.

4. A fluid flow check device of claim 1 wherein the alarm means includes a timer circuit means for activating an alarm if the flow condition changes and remains changed for a present duration.

* * * * *